(12) United States Patent
Anschutz et al.

(10) Patent No.: US 9,231,656 B2
(45) Date of Patent: Jan. 5, 2016

(54) SYSTEM AND METHOD TO REDUCE CROSSTALK OF DIGITAL SUBSCRIBER LINES

(75) Inventors: Thomas Anschutz, Conyers, GA (US); Thomas Starr, Barrington, IL (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 1378 days.

(21) Appl. No.: 12/608,421

(22) Filed: Oct. 29, 2009

(65) Prior Publication Data

US 2011/0103574 A1 May 5, 2011

(51) Int. Cl.
  *H04M 9/08* (2006.01)
  *H04B 3/32* (2006.01)
(52) U.S. Cl.
  CPC .......................................... *H04B 3/32* (2013.01)
(58) Field of Classification Search
  CPC ..... H04M 3/2209; H04M 11/06; H04M 1/58; H04M 9/08; H04M 1/74; H04M 11/062; H04M 3/34; H04M 3/18; H04M 3/306; H04M 3/304; H04M 3/305; H04M 3/002; H04M 3/007; H04M 3/085; H04M 3/12; G07F 7/08; H04B 3/23; H04B 3/32; H04B 3/487; H04B 3/50; H04N 7/48; H04L 1/20; H04L 25/03343; H04L 27/2647; H04L 5/20
  USPC .................... 379/93.01, 392, 392.01, 406.01, 379/406.06, 1.03, 93.05, 416, 417, 22, 23, 379/27.01, 28, 93.08, 406.08; 375/210, 375/222, 227, 254, 278, 285, 260, 284, 346, 375/219, 220, 257, 295, 296, 340; 370/200, 370/201, 222
  See application file for complete search history.

(56) References Cited

U.S. PATENT DOCUMENTS

| | | | |
|---|---|---|---|
| 2005/0105473 A1 | 5/2005 | Hausman et al. | |
| 2006/0276918 A1* | 12/2006 | Cioffi et al. | 700/94 |
| 2008/0056484 A1* | 3/2008 | Fortier | 379/416 |
| 2008/0219290 A1 | 9/2008 | Cioffi et al. | |
| 2009/0034592 A1 | 2/2009 | Mirfakhraei et al. | |
| 2009/0207985 A1* | 8/2009 | Cioffi et al. | 379/93.01 |
| 2009/0270038 A1* | 10/2009 | Clausen | 455/63.1 |
| 2009/0304056 A1* | 12/2009 | De Lind Van Wijngaarden et al. | 375/222 |
| 2010/0177838 A1* | 7/2010 | Schenk | 375/285 |
| 2010/0232486 A1* | 9/2010 | Starr et al. | 375/222 |
| 2010/0278222 A1* | 11/2010 | De Lind Van Wijngaarden et al. | 375/220 |
| 2011/0080938 A1* | 4/2011 | Fisher et al. | 375/222 |

* cited by examiner

Primary Examiner — Akelaw Teshale
(74) Attorney, Agent, or Firm — Toler Law Group, PC

(57) ABSTRACT

A computer implemented method includes determining crosstalk characteristics of a plurality of digital subscriber lines. The computer implemented method includes identifying pairs of digital subscriber lines, each of the pairs including a first digital subscriber line and a second digital subscriber line, where the first digital subscriber line has a crosstalk characteristic that is correlated to the second digital subscriber line. The computer implemented method also includes rearranging terminations at an access node to assign at least one of the identified pairs of digital subscriber lines to a common vectoring group.

20 Claims, 6 Drawing Sheets

SYSTEM AND METHOD TO REDUCE CROSSTALK OF DIGITAL SUBSCRIBER LINES

FIELD OF THE DISCLOSURE

The present disclosure is generally related to reducing crosstalk of digital subscriber lines.

BACKGROUND

Digital subscriber lines may be used by a service provider to deliver broadband services to subscribers. As broadband services continue to use more bandwidth (e.g. bit rate capacity), service providers may desire to increase the bit rate capacity of the digital subscriber lines. One approach to increasing bit rate capacity is to reduce crosstalk among the digital subscriber lines. For example, Digital Spectrum Management (DSM) vectoring may be used to reduce the crosstalk of digital subscriber lines and thereby increase the bit rate capacity of the digital subscriber lines. However, as the number of digital subscriber lines increases, reducing cross-talk of the digital subscriber lines may become progressively more difficult.

DETAILED DESCRIPTION

Figure 1:
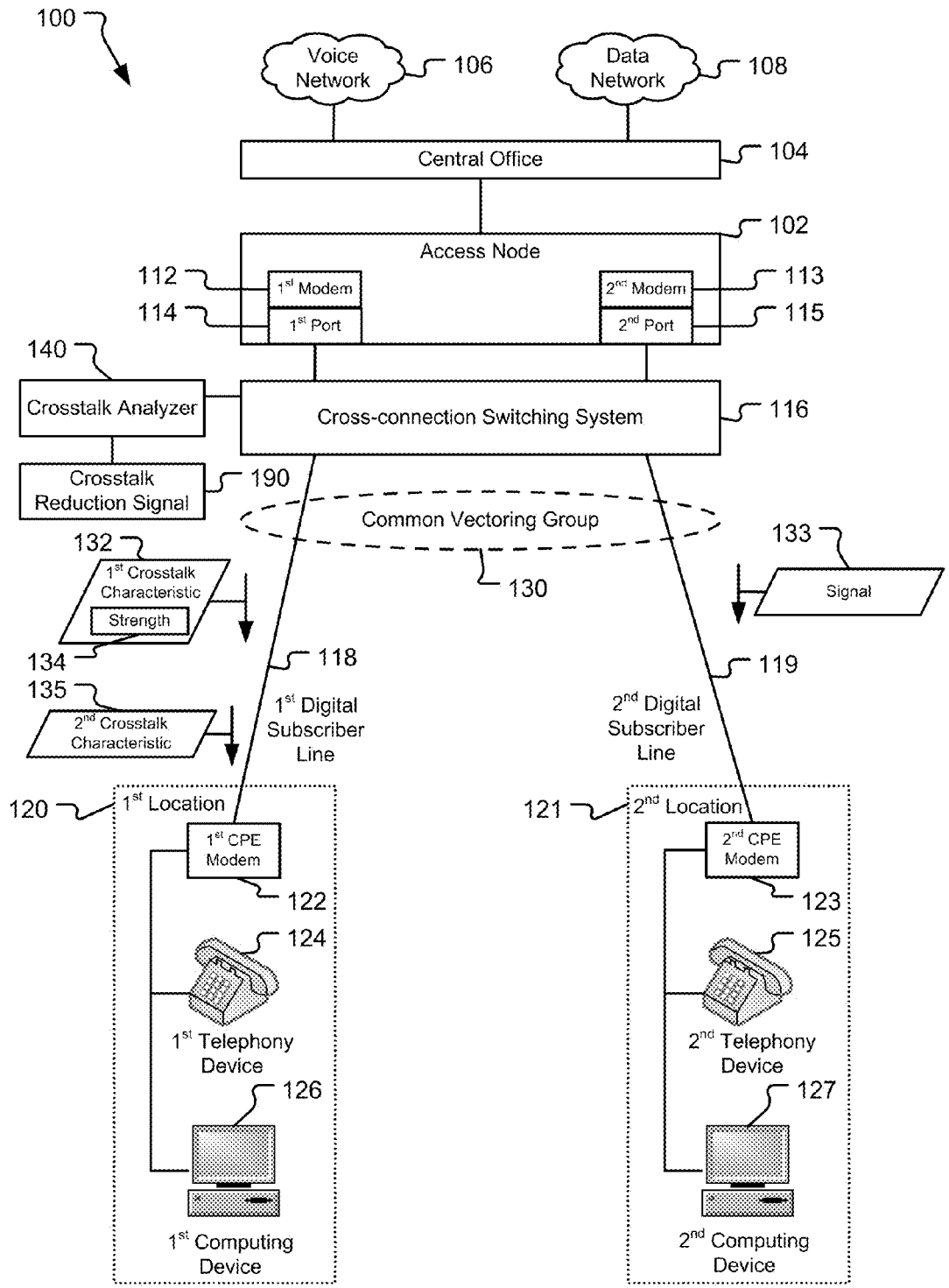
FIG. 1 is a block diagram of a first particular embodiment of a system to reduce crosstalk of digital subscriber lines.

Crosstalk characteristics of a plurality of digital subscriber lines are determined. Pairs of digital subscriber lines are identified. Each pair includes a first digital subscriber line and a second digital subscriber line. The first digital subscriber line has a crosstalk characteristic that is correlated to the second digital subscriber line. Terminations of the digital subscriber lines at an access node are rearranged to assign at least one of the identified pairs of digital subscriber lines to a common vectoring group based on a strength of the correlated crosstalk characteristic.

In a particular embodiment, a computer implemented method includes determining crosstalk characteristics of a plurality of digital subscriber lines. The method includes identifying pairs of digital subscriber lines, each pair including a first digital subscriber line and a second digital subscriber line. The first digital subscriber line has a crosstalk characteristic that is correlated to the second digital subscriber line. The method also includes rearranging terminations of the digital subscriber lines at an access node to assign at least one of the identified pairs of digital subscriber lines to a common vectoring group based on a strength of the correlated crosstalk characteristic.

In another particular embodiment, a system includes a processor and a memory accessible to the processor. The memory includes operational instructions executable by the processor to determine crosstalk characteristics of digital subscriber lines. The operational instructions are further executable by the processor to determine pairs of the digital subscriber lines. Each of the pairs includes a first digital subscriber line and a second digital subscriber line. The first digital subscriber line has a crosstalk characteristic that is correlated to the second digital subscriber line. The operational instructions are further executable by the processor to assign at least one pair of the digital subscriber lines to a common vectoring group.

In another particular embodiment, a computer-readable storage medium includes operational instructions, that when executed by a processor, cause the processor to determine a crosstalk characteristic of each digital subscriber line of a plurality of digital subscriber lines. The operational instructions are further executable by the processor to determine pairs of the digital subscriber lines. Each of the pairs includes a first digital subscriber line and a second digital subscriber line. The pairs are determined based on the crosstalk characteristic of each of the digital subscriber lines. The operational instructions are further executable by the processor to assign a pair of the digital subscriber lines to a common vectoring group when the crosstalk characteristic of at least one of the digital subscriber lines of the pair exceeds a threshold. The operational instructions are further executable by the processor to reduce crosstalk of the digital subscriber lines in the common vectoring group.

Referring to FIG. 1, a block diagram of a first particular embodiment of a system to reduce crosstalk of digital subscriber lines is depicted and generally designated 100. The system 100 includes an access node 102 coupled to a voice network 106 and a data network 108 via a central office 104. A cross-connection switching system 116 is coupled to the access node 102 and to digital subscriber lines, such as a first digital subscriber line 118 and a second digital subscriber line 119. A crosstalk analyzer 140 is coupled to the cross-connection switching system 116.

The first digital subscriber line 118 is coupled to a first Customer Premise Equipment (CPE) modem 122 at a first location 120, and the second digital subscriber line 119 is coupled to a second CPE modem 123 at a second location 121. The first CPE modem 122 may be coupled to various devices at the first location 120, such as a first telephony device 124 and a first computing device 126. The second CPE modem 123 may be coupled to various devices at the second location 121, such as a second telephony device 125 and a second computing device 127. Each of the computing devices 126-127 may be a set-top box device, a desktop computing device, a laptop computing device, a display device, a consumer electronics device, another computing device, or any combination thereof.

The central office 104 may include a telephone exchange to access the voice network 106 and a data packet switch to access the data network 108. The voice network 106 may be a public telephone switching network (PSTN). The data network 108 may be a private data network, a public data network, another type of data network, or any combination thereof. The data network 108 may use one or more protocols and standards, such as Asynchronous Transfer Mode (ATM) protocol, Institute of Electrical and Electronic Engineers (IEEE) 802.11 standard, Internet Protocol (IP), another protocol or standard, or any combination thereof The access node 102 may include various modems and ports, such as a first modem 112, a second modem 113, a first port 114, and a second port 115. The ports 114-115 may also be referred to as terminations because the digital subscriber lines 118-119 terminate at the ports 114-115 of the access node 102. The access node 102 may enable a digital subscriber line to provide a particular location with access to the voice network 106 and the data network 108 simultaneously. For example, the first digital subscriber line 118 may enable devices at the first location 120 to access various services, such as voice telephony services, data services, Internet Protocol Television (IPTV) services, other services, or any combination thereof.

The cross-connection switching system 116 may be a connection matrix between digital subscriber lines, such as the digital subscriber lines 118-119, and the access node 102. The cross-connection switching system 116 may enable a digital subscriber line to be switched from one port of the access node 102 to another port of the access node 102. For example, the cross-connection switching system 116 may enable the first digital subscriber line 118 to be switched from the first port 114 to the second port 115. By enabling switching of digital subscriber lines, digital subscriber lines having a similar or correlated characteristic may be grouped together. In a particular embodiment, the cross-connection switching system 116 may be implemented using a metallic cross-connection using relays or other metallic connection techniques. In another particular embodiment, analog signals received at inputs of the cross-connection switching system 116 may be converted to a digital format to enable the cross-connection switching system 116 to cross-connect the digital signals.

When a modem at the access node 102 malfunctions, the cross-connection switching system 116 may be used to reconnect digital subscriber lines to the access node 102 in a manner that avoids connecting any of the digital subscriber line to the malfunctioning modem. For example, when the first modem 112 is determined to be malfunctioning, the cross-connection switching system 116 may reconnect one or more of the digital subscriber lines 118-119 to functioning modems at the access node 102 and not connect the digital subscriber lines 118-119 to the malfunctioning first modem 112. The cross-connection switching system 116 may also be used to connect one of the digital subscriber lines 118-119 to a particular port of the access node 102 that has line testing functions (e.g. test head). For example, when the second port 115 provides line test functions and the first digital subscriber line 118 is to be tested, the cross-connection switching system 116 may temporarily connect the first digital subscriber line 118 to the second port 115 for testing.

The crosstalk analyzer 140 may determine a first crosstalk characteristic 132 of the first digital subscriber line 118. The crosstalk analyzer 140 may determine whether the first crosstalk characteristic 132 is correlated to a crosstalk characteristic of the second digital subscriber line 119 or of another digital subscriber line (not shown). By comparing crosstalk characteristics associated with a plurality of digital subscriber lines, the crosstalk analyzer 140 may group pairs of digital subscriber lines together when digital subscriber lines that have correlated crosstalk characteristics are identified. For example, the crosstalk analyzer 140 may determine that the first crosstalk characteristic 132 of the first digital subscriber line 118 is correlated to a signal 133 at the second digital subscriber line 119. The crosstalk analyzer 140 may instruct the cross-connection switching system 116 to group the pairs of digital subscriber lines together by switching the digital subscriber lines to terminate at adjacent ports of the access node 102. For example, the crosstalk analyzer 140 may instruct the cross-connection switching system 116 to group the first digital subscriber line 118 and the second digital subscriber line 119 as a pair of digital subscriber lines in a common vectoring group 130 to enable crosstalk in the common vectoring group 130 to be reduced.

In operation, the crosstalk analyzer 140 may determine crosstalk characteristics of the digital subscriber lines coupled to the cross-connection switching system 116. For example, the crosstalk analyzer 140 may determine the first crosstalk characteristic 132 of the first digital subscriber line 118. The first crosstalk characteristic 132 may be a measure associated with how signals sent via other digital subscriber line affect the first digital subscriber line 118. For example, when the signal 133 is sent via the second digital subscriber line 119, the signal 133 may be detectable at the first digital subscriber 118 due to crosstalk between the first digital subscriber line 118 and the second digital subscriber line 119. The crosstalk analyzer 140 may identify pairs of digital subscriber lines, such as the pair of digital subscriber lines that includes the first digital subscriber line 118 and the second digital subscriber line 119, that have correlated crosstalk characteristics. For example, the first digital subscriber line 118 and the second digital subscriber line 119 may be assigned to a pair based on a determination that the first crosstalk characteristic 132 of the first digital subscriber line 118 is correlated with a crosstalk characteristic of the second digital subscriber line 119. To illustrate, the crosstalk analyzer 140 may determine that the first crosstalk characteristic 132 of the first digital subscriber line 118 is correlated to the signal 133 of the second digital subscriber line 119. When crosstalk occurs within a pair of digital subscriber lines, the signal 133 of the second digital subscriber line 119 may manifest in the first digital subscriber line 118 as the crosstalk characteristic 132. The crosstalk analyzer 140 can compare the crosstalk characteristic 132 and the signal 133 to determine whether the crosstalk characteristic 132 is correlated with the second digital subscriber line 119. In this way, the crosstalk analyzer 140 can identify pairs of digital subscriber lines having correlated crosstalk characteristics from the digital subscriber lines that terminate at the access node 102.

The crosstalk analyzer 140 may instruct the cross-connection switching system 116 to rearrange the digital subscriber lines that terminate at the access node 102 to assign at least one of the identified pairs of digital subscriber lines to the common vectoring group 130 based on a strength 134 of the correlated crosstalk characteristic 132 of each pair. The crosstalk analyzer 140 may assign pairs of digital subscriber lines to the common vectoring group 130 by rearranging the terminations of some of the digital subscriber lines that terminate at the access node 102. Rearranging the terminations may include physically disconnecting a particular digital subscriber line from the first port 114 of the access node and reconnecting the particular digital subscriber line to the second port 115 of the access node 102. The terminations may also, or in the alternative, be rearranged by electronically switching the terminations via the cross-connection switching system 116.

The crosstalk analyzer 140 may determine a set of strongly coupled pairs from the pairs of digital subscriber lines based on the strength 134 of the correlated crosstalk characteristic 132 of each pair of digital subscriber lines. The crosstalk analyzer 140 may, via the cross-connection switching system 116, rearrange the terminations of the strongly coupled pairs without rearranging the terminations of the other pairs of digital subscriber lines. The crosstalk analyzer 140 may reduce crosstalk of one or more digital subscriber lines in the common vectoring group 130. For example, the crosstalk analyzer 140 may reduce the crosstalk characteristic 132 of the first digital subscriber line 118 in the common vectoring group 130. To illustrate, when the crosstalk analyzer 140 determines that the first digital subscriber line 118 has the crosstalk characteristic 132 that is correlated to the signal 133 of the second digital subscriber line 119, the crosstalk analyzer 140 may use the signal 133 to reduce the crosstalk characteristic 132 of the first digital subscriber line 118. For example, the crosstalk analyzer 140 may create a crosstalk reduction signal 190 based on the signal 133 to reduce the crosstalk characteristic 132. To illustrate, the crosstalk analyzer 140 may create the crosstalk reduction signal 190 to be out of phase with the signal 133 to reduce the effect of the signal 133 on the first digital subscriber line 118.

The crosstalk analyzer 140 may determine second crosstalk characteristics 135 of each of the digital subscriber lines in the common vectoring group 130 after rearranging the terminations at the access node 102. The crosstalk analyzer 140 may determine whether to further rearrange the terminations based on the second crosstalk characteristics 135.

Thus, the crosstalk analyzer 140 may be used to determine crosstalk characteristics of the digital subscriber lines terminating at the access node 102. The crosstalk analyzer 140 may identify pairs of digital subscriber lines based on the crosstalk characteristic 132 of each pair and assign them to a common vectoring group 130. The crosstalk analyzer 140 may reduce the crosstalk characteristic 132 of each pair of digital subscriber lines in the common vectoring group 130. By reducing the crosstalk characteristic 132 of each pair of digital subscriber lines, bit rate capacity available via each of the digital subscriber lines may be increased. For example, by reducing the first crosstalk characteristic 132, a bit rate capacity of the first digital subscriber line 118 may be increased. Increasing the bit rate capacity of the first digital subscriber line 118 may allow a service provider to provide additional services at the first location 120 or to provide higher bit rate capacity access to the data network 108 from the first location 120.

Figure 2:
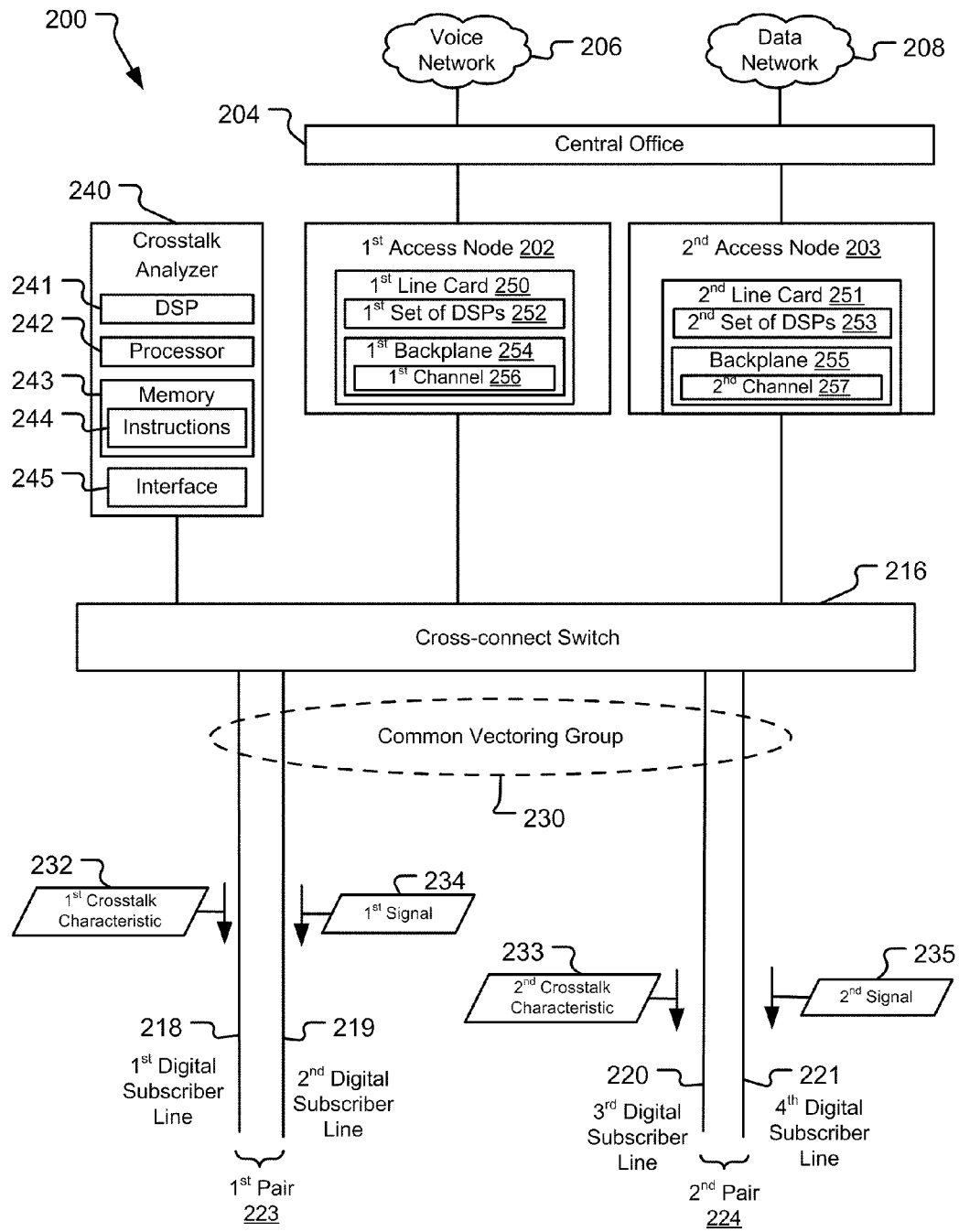
FIG. 2 is a block diagram of a second particular embodiment of a system to reduce crosstalk of digital subscriber lines.

Referring to FIG. 2, a block diagram of a second particular embodiment of a system to reduce crosstalk in digital subscriber lines is depicted and generally designated 200. The system 200 includes a first access node 202 and a second access node 203 coupled to a voice network 206 and a data network 208 via a central office 204. Digital subscriber lines 218, 219, 220, and 221 are coupled to the access nodes 202-203 via a cross-connect switch 216.

A crosstalk analyzer 240 is coupled to the cross-connect switch 216. The crosstalk analyzer 240 includes a digital signal processor (DSP) 241, a processor 242, a memory 243, and an interface 245. The crosstalk analyzer 240 may be coupled to the cross-connect switch 216 using the interface 245. The memory 243 includes instructions 244 that are executable by the processor 242, by the DSP 241, or both, to perform various functions of the crosstalk analyzer 240. The crosstalk analyzer 240 may determine a first crosstalk characteristic 232 of a first digital subscriber line 218 and determine that the first crosstalk characteristic 232 is correlated to a second digital subscriber line 219. For example, the crosstalk analyzer 240 may determine that the first crosstalk characteristic 232 of the first digital subscriber line 218 is correlated to a first signal 234 at the second digital subscriber line 219. The crosstalk analyzer 240 may instruct the cross-connection switch 216 to group pairs of the digital subscriber lines 218-221 together by switching the digital subscriber lines 218-221 to terminate at adjacent ports at one of the access nodes 202-203. The crosstalk analyzer 240 may group the first and second digital subscriber lines 218-219 into a first pair 223 because the first crosstalk characteristic 232 of the first digital subscriber line 218 is correlated to the second digital subscriber line 219. The crosstalk analyzer 240 may group the third and fourth digital subscriber lines 220-221 into a second pair 224 because a second crosstalk characteristic 233 of the third digital subscriber line 220 is correlated to the fourth digital subscriber line 221. The crosstalk analyzer 240 may instruct the cross-connection switching system 216 to group the first pair 223 and the second pair 224 into a common vectoring group 230 to enable reduction of the crosstalk of the digital subscriber lines 218-221 in the common vectoring group 230.

The central office 204 may include a telephone exchange to access the voice network 206 and a data packet switch to access the data network 208. The voice network 206 may be a Public telephone switching network (PSTN). The data network 208 may be a private data network, a public data network, optical data network, Internet Protocol (IP) data network, another type of data network, or any combination thereof. The data network 208 may use one or more protocols and standards, such as Asynchronous Transfer Mode (ATM) protocol, Institute of Electrical and Electronic Engineers (IEEE) 802.11 standard, Internet Protocol (IP), another protocol or standard, or any combination thereof.

The first access node 202 includes one or more line cards, including a first line card 250. The first line card 250 includes at least a first set of DSPs 252 and a first backplane 254. The first backplane 254 includes at least a first channel 256. The first set of DSPs 252 may have one or more digital signal processors. The first channel 256 may be used by the first set of DSPs 252 to exchange various types of data, including crosstalk characteristics of the digital subscriber lines 218-221. The first line card 250 may terminate one or more of the digital subscriber lines 218-221 at the first access node 202.

The second access node includes one or more line cards, including a second line card 251. The second line card 251 includes at least a second set of DPSs 253 and a backplane 255. The second set of DSPs 253 may have one or more digital signal processors. The backplane 255 includes a second channel 257. The second channel 257 may be used by the second set of DSPs 253 to exchange various types of data, including crosstalk characteristics of the digital subscriber lines 218-221. The second line card 251 may terminate one or more of the digital subscriber lines 218-221 at the second access node 203.

The cross-connection switch 216 may be a connection matrix between digital subscriber lines, such as the digital subscriber lines 218-221, and the access nodes 202-203. The cross-connection switch 216 may enable each of the digital subscriber lines 218-221 to be switched from one port of either of the access nodes 202-203 to another port of either of the access nodes 202-203. By enabling switching of digital subscriber lines, digital subscriber lines having a similar or correlated characteristic may be grouped together. The cross-connection switch 216 may couple the first access node 202 to the second access node 203, thereby enabling the first set of DSPs 252 and the second set of DSPs 253 to exchange crosstalk characteristics of digital subscriber lines. For example, the cross-connection switch 216 may enable crosstalk characteristics of digital subscriber lines to be reduced across multiple access nodes, such as the access nodes 202-203. In a particular embodiment, the cross-connection switch 216 may be implemented using a metallic cross-connection using relays or other metallic connection techniques. In another particular embodiment, analog signals received at inputs of the cross-connection switch 216 may be converted to a digital format to enable the cross-connection switch 216 to cross-connect the digital signals.

In operation, the crosstalk analyzer 240 may determine crosstalk characteristics of digital subscriber lines coupled to the cross-connect switch 216. For example, the crosstalk analyzer 240 may determine the first and second crosstalk characteristics 232-233 of the digital subscriber lines 218-221. The crosstalk analyzer 240 may determine pairs of the digital subscriber lines, such as the first pair 223 and the second pair 224, based on the crosstalk characteristics 232-233. The crosstalk analyzer 240 may determine that first crosstalk characteristic 232 of the first digital subscriber line 218 is correlated to a first signal 234 of the second digital subscriber line 219. The crosstalk analyzer 240 may determine that the second crosstalk characteristic 233 of the third digital subscriber line 220 is correlated to a second signal 235 of the fourth digital subscriber line 221. The crosstalk analyzer 240 may assign at least one of the pairs 223-224 to the common vectoring group 230. The crosstalk analyzer 240 may use the interface 245 to instruct the cross-connect switch 216 to switch termination points of one or more of the digital subscriber lines 218-221 when assigning at least one of the pairs 223-224 to the common vectoring group 230.

The DSP 241 may be coupled to the cross-connect switch 216 and to the digital subscriber lines 218-221. The DSP 241 may reduce crosstalk between pairs 223-224 of digital subscriber lines assigned to the common vectoring group 230. For example, the crosstalk analyzer 240 may identify the first crosstalk characteristic 232 as being correlated to first signal 233 of the second digital subscriber line 219 and subtract the first signal 233 (e.g., using an out of phase signal based on the first signal 233) from the first digital subscriber line 218 to reduce the first crosstalk characteristic 232. The DSP 241 may identify the second crosstalk characteristic 233 of the third digital subscriber line 220 and reduce the second crosstalk characteristic 233 by subtracting the second signal 235 (e.g., using an out of phase signal based on the second signal 235) from the third digital subscriber line 220. In this way, the DSP 241 may reduce the crosstalk characteristics 232-233 of the pairs 223-224 of digital subscriber lines in the common vectoring group 230.

The first set of DSPs 252 may reduce crosstalk characteristics of digital subscriber lines terminating at the first access node 202 by exchanging crosstalk characteristics among the first set of DSPs 252 via the first channel 256. The second set of DSPs 253 may reduce crosstalk characteristics of digital subscriber lines terminating at the second access node 203 by exchanging crosstalk characteristics among the second set of DSPs 253 via the second channel 257. Thus, the crosstalk characteristics of the digital subscriber lines 218-221 may be reduced across the first access node 202 and the second access node 203.

The crosstalk analyzer 240 may be used to determine crosstalk characteristics of the digital subscriber lines 218-221 terminating at the access nodes 202-203. The crosstalk analyzer 240 may identify the pairs 223-224 of the digital subscriber lines 218-221 based on the crosstalk characteristics 232-233 and assign the pairs 223-224 to a common vectoring group 230. The crosstalk analyzer 240 may reduce the crosstalk characteristics 232-233 of the digital subscriber lines 218-221 in the common vectoring group 230. By reducing the crosstalk characteristics 232-233 of each of the pairs 223-224, bit rate capacity of the digital subscriber lines 218-221 may be increased. Increasing the bit rate capacity of the digital subscriber lines 218-221 may allow a service provider to provide additional services or to provide higher bit rate capacity access to subscribers.

Figure 3:
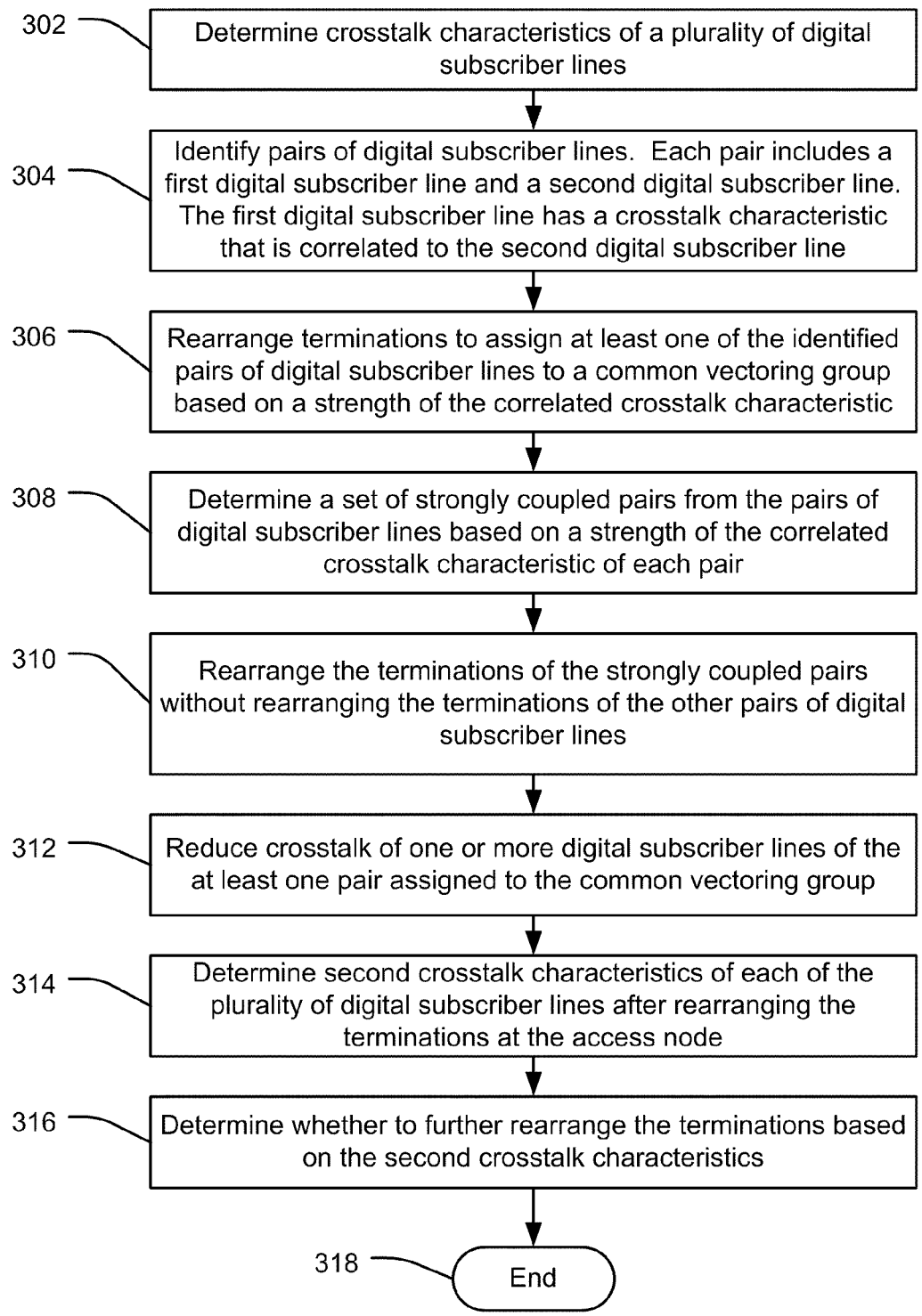
FIG. 3 is a flow diagram of a first particular embodiment of a method to reduce crosstalk of digital subscriber lines.

Referring to FIG. 3, a flow diagram of a first particular embodiment of a method to reduce crosstalk in digital subscriber lines is depicted. The method may be performed by a crosstalk analyzer, such as the crosstalk analyzer 140 of FIG. 1 or the crosstalk analyzer 240 of FIG. 2.

The method begins by determining crosstalk characteristics of a plurality of digital subscriber lines, at 302. Moving to 304, pairs of digital subscriber lines are identified. Each pair includes a first digital subscriber line and a second digital subscriber line. The first digital subscriber line has a crosstalk characteristic that is correlated to the second digital subscriber line. For example, in FIG. 1, the crosstalk analyzer 140 may identify a pair of digital subscriber lines, including the first digital subscriber line 118 and the second digital subscriber line 119, based on correlating the first crosstalk characteristic 132 of the first digital subscriber line 118 to the second digital subscriber line 119.

Advancing to 306, terminations of the digital subscriber lines are rearranged to assign at least one of the identified pairs of digital subscriber lines to a common vectoring group based on a strength of the correlated crosstalk characteristics. In a particular embodiment, rearranging the terminations of the digital subscriber lines may include, at 308, determining a set of strongly coupled pairs from the pairs of digital subscriber lines based on a strength of the correlated crosstalk characteristic of each pair. The strongly coupled pairs may include a set of the digital subscriber lines that have a stronger correlation of the crosstalk characteristics than other pairs of the digital subscriber lines. Advancing to 310, the terminations of the strongly coupled pairs may be rearranged without rearranging the terminations of the other pairs of digital subscriber lines.

Proceeding to 312, crosstalk of one or more of the digital subscriber lines of the at least one pair assigned to the common vectoring group is reduced. For example, in FIG. 1, the crosstalk analyzer 140 may reduce the first crosstalk characteristic 132 by subtracting the signal 133 from the first digital subscriber line 118. Continuing to 314, second crosstalk characteristics of each of the plurality of digital subscriber lines may be determined after rearranging the terminations of the digital subscriber lines at an access node. Advancing to 316, a determination is made whether to further rearrange the termination as based on the second crosstalk characteristics. For example, in FIG. 1, the crosstalk analyzer 140 may determine the second crosstalk characteristic 135 and determine whether to instruct the cross-connection switching system 116 to further rearrange the terminations of the digital subscriber lines 118-119. The method ends at 318.

Thus, pairs of digital subscriber lines that have a correlated crosstalk characteristic can be grouped into a common vectoring group to reduce crosstalk. To reap benefits of reduced crosstalk of a set of digital subscriber lines without rearranging all of the digital subscriber lines, only digital subscriber lines that will be most affected may be rearranged. For example, only those pairs of digital subscriber lines with a relatively strong correlated crosstalk characteristic may be assigned to a common vectoring group. Reducing the correlated crosstalk characteristics of the digital subscriber lines in the common vectoring group can result in increased bit rate capacity for the digital subscriber lines in the common vectoring group.

Figure 4:
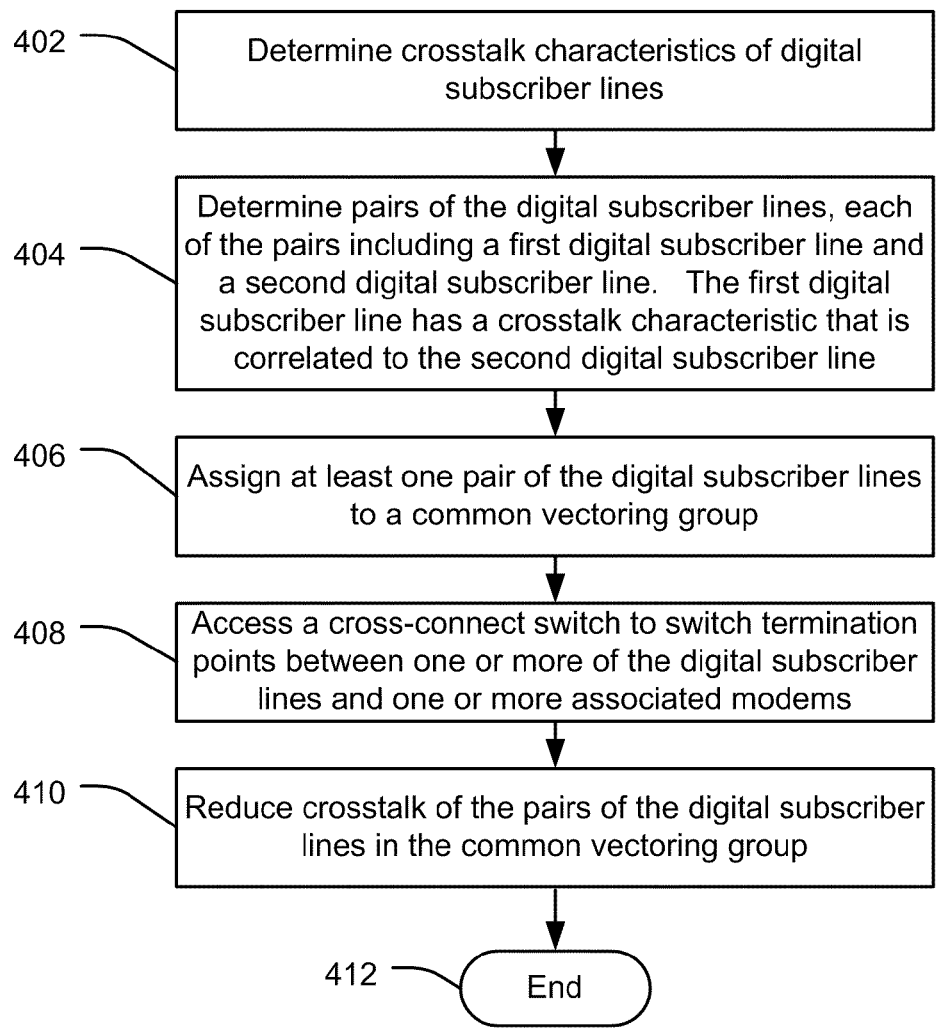
FIG. 4 is a flow diagram of a second particular embodiment of a method to reduce crosstalk of digital subscriber lines.

Referring to FIG. 4, a flow diagram of a second particular embodiment of a method to reduce crosstalk in digital subscriber lines is depicted. The method may be performed by a crosstalk analyzer, such as the crosstalk analyzer 140 of FIG. 1, or the crosstalk analyzer 240 of FIG. 2.

The method begins by determining crosstalk characteristics of digital subscriber lines, at 402. Advancing to 404, pairs of the digital subscriber lines are determined. Each of the pairs of digital subscriber lines includes a first digital subscriber line and a second digital subscriber line. The first digital subscriber line has a crosstalk characteristic that is correlated to the second digital subscriber line. Moving to 406, at least one pair of the digital subscriber lines is assigned to a common vectoring group. Advancing to 408, a cross-connect switch is accessed to switch termination points between one or more of the digital subscriber lines and one or more associated modems. Continuing to 410, crosstalk of the pairs of the digital subscriber lines in the common vectoring group is reduced. For example, in FIG. 1, the crosstalk analyzer 140 may pair digital subscriber lines 118-119 based on the first crosstalk characteristic 132 and assign the pair to the common vectoring group 130. The crosstalk analyzer 140 may reduce crosstalk characteristics of the pairs of digital subscriber lines in the common vectoring group 130. The method ends at 412.

Thus, a crosstalk analyzer can pair digital subscriber lines that have a correlated crosstalk characteristic. The crosstalk analyzer can assign those pairs of digital subscriber lines with a relatively strong correlated crosstalk characteristic to a common vectoring group. The crosstalk analyzer can reduce the correlated crosstalk characteristics of the digital subscriber lines in the common vectoring group, resulting in increased bit rate capacity for the digital subscriber lines in the common vectoring group.

Figure 5:
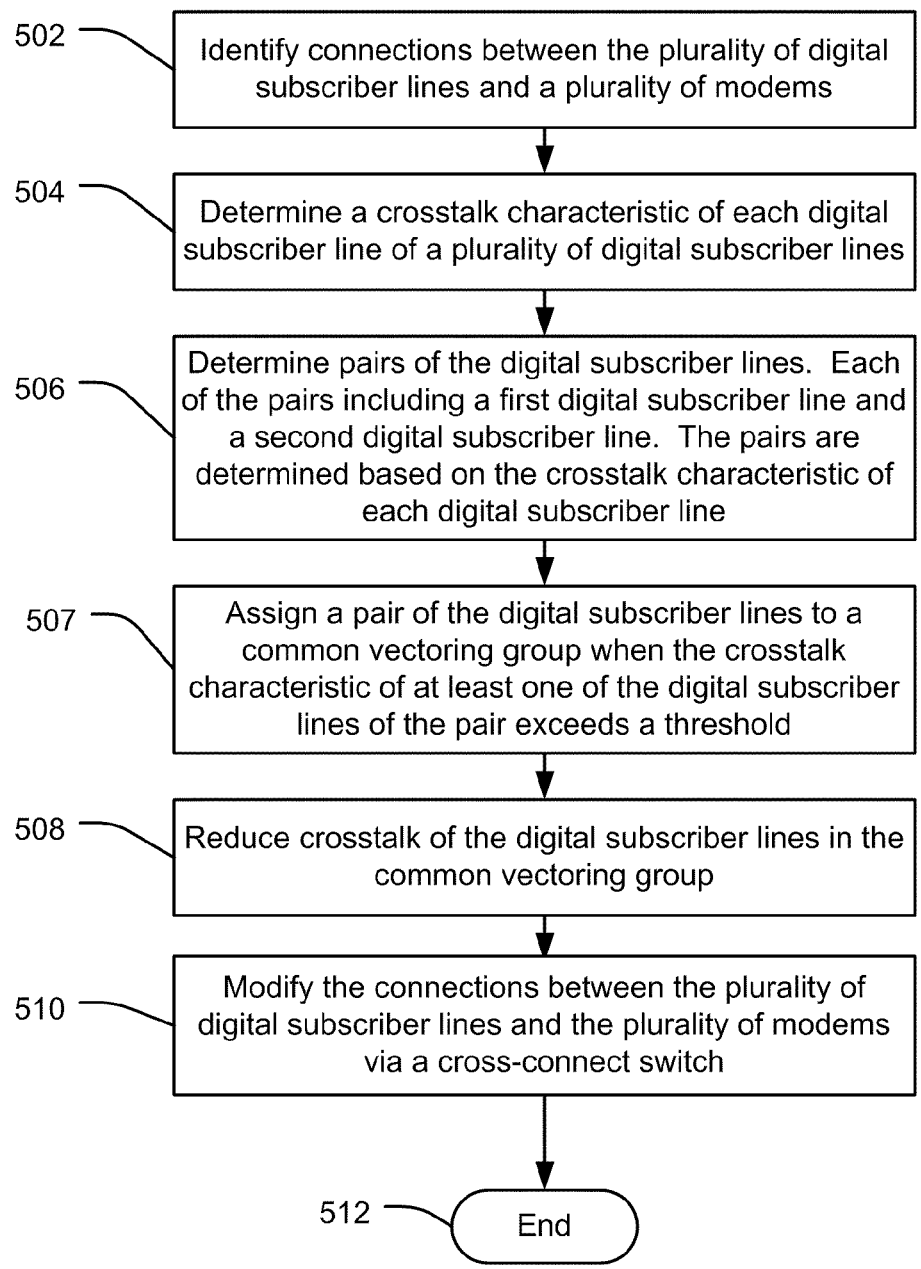
FIG. 5 is a flow diagram of a third particular embodiment of a method to reduce crosstalk of digital subscriber lines.

Referring to FIG. 5, a flow diagram of a third particular embodiment of a method to reduce crosstalk in digital subscriber lines is depicted. The method may be performed by a crosstalk analyzer, such as the crosstalk analyzer such as the crosstalk analyzer 140 of FIG. 1 or the crosstalk analyzer 240 of FIG. 2.

Connections between a plurality of digital subscriber lines and a plurality of modems are indentified, at 502. Moving to 504, a crosstalk characteristic of each digital subscriber line is determined. Advancing to 506, pairs of the digital subscriber lines are determined. Each of the pairs includes a first digital subscriber line and a second digital subscriber line. The pairs are determined based on the crosstalk characteristic of each of the digital subscriber lines. Advancing to 507, a pair of the digital subscriber lines is assigned to a common vectoring group when the crosstalk characteristic of at least one of the digital subscriber lines of a pair exceeds a threshold. The threshold may be specified to select only pairs of the digital subscriber lines that have the most strongly correlated crosstalk characteristics. Additionally, or in the alternative, the threshold may be adjustable to limit a number of pairs of the digital subscriber lines that exceed the threshold to a maximum number of pairs to be rearranged (e.g., a maximum capacity of a cross-connect switch). Continuing to 508, the connections between the plurality of digital subscriber lines and the plurality of modems are modified via the cross-connect switch. Moving to 510, crosstalk of the digital subscriber lines in the common vectoring group is reduced. For example, in FIG. 1, the crosstalk analyzer 140 may pair digital subscriber lines 118-119 based on the first crosstalk characteristic 132 and assign the pair to the common vectoring group 130. The crosstalk analyzer 140 may reduce crosstalk characteristics of the pairs of digital subscriber lines in the common vectoring group 130. The method ends at 512.

Thus, a crosstalk analyzer can pair digital subscriber lines that have a correlated crosstalk characteristic. The crosstalk analyzer can assign those pairs of digital subscriber lines with a relatively strong correlated crosstalk characteristic to a common vectoring group and rearrange terminations of those pairs at an access node. The crosstalk analyzer can reduce the correlated crosstalk characteristics of the digital subscriber lines in the common vectoring group, resulting in increased bit rate capacity for the digital subscriber lines in the common vectoring group.

Figure 6:
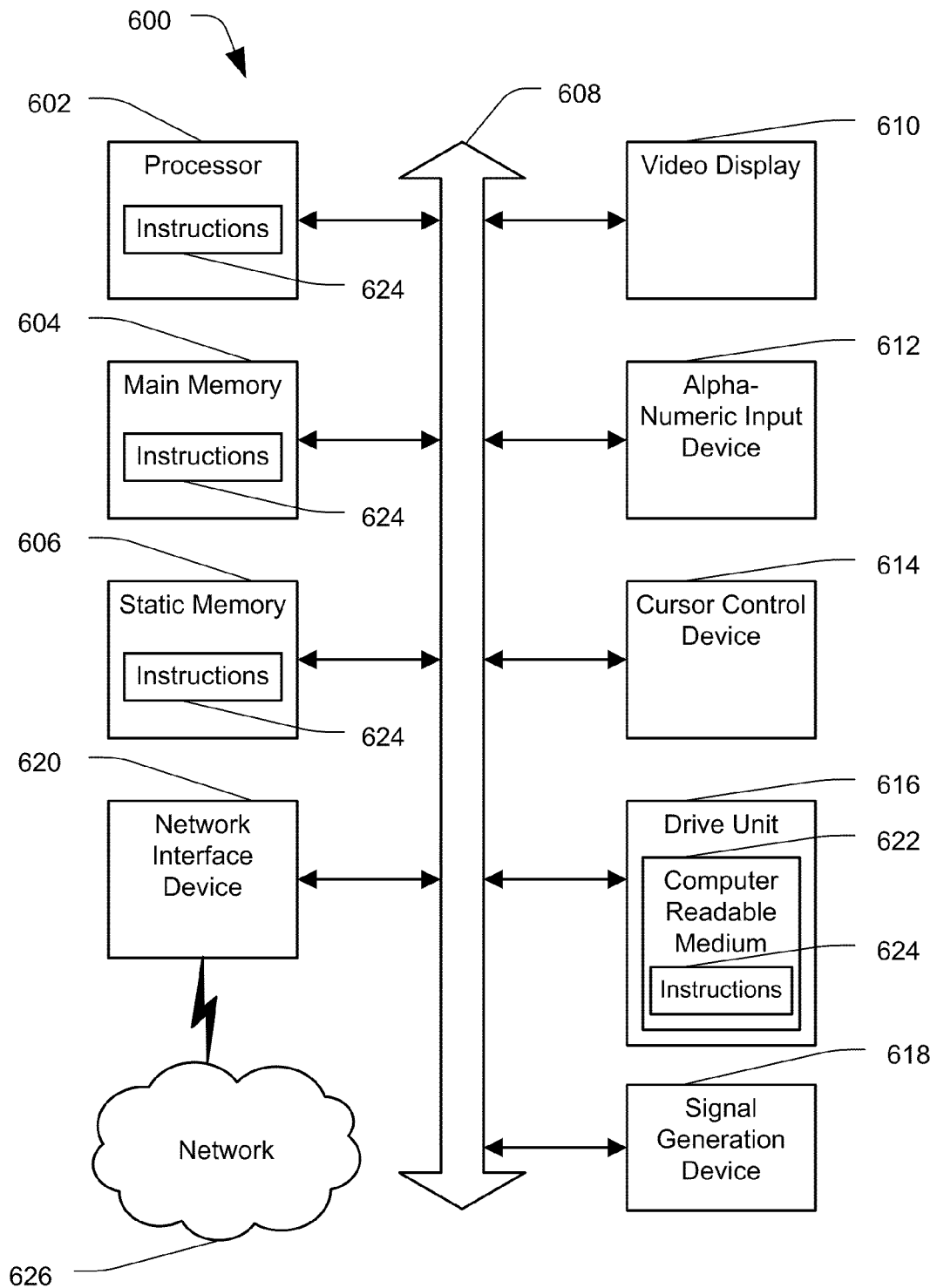
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600, or any portion thereof, may operate as a standalone device or may be connected, e.g., using a network, to other computer systems or peripheral devices. The computer system 600 may include or be included within any one or more of the crosstalk analyzer 14 of FIG. 1, the crosstalk analyzer 240 of FIG. 2, or any combination thereof.

In a networked deployment, the computer system 600 may operate in the capacity of a central office, an access node, a crosstalk analyzer, a telephony device, a computing device, or any combination thereof, as described above with reference to FIGS. 1-2. The computer system 600 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid-state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 624 to enable a device connected to a network 626 to communicate voice, video or data over the network 626. Further, the instructions 624 may be transmitted or received over the network 626 via the network interface device 620.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, VoIP, IPTV, MPEG, SMPTE, ATM, IEEE 802.11, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:
1. A method comprising:
identifying a crosstalk characteristic of each of a plurality of digital subscriber lines;
identifying a pair of digital subscriber lines from the plurality of digital subscriber lines,
the pair of digital subscriber lines including a first digital subscriber line and a second digital subscriber line, wherein the crosstalk characteristic of the first digital subscriber line has a correlation to the second digital subscriber line;

assigning the first digital subscriber line, the second digital subscriber line, or both, of the pair of digital subscriber lines to a common vectoring group, wherein the common vectoring group has a threshold number of digital subscriber lines; and reducing an amount of a particular crosstalk characteristic of the first digital subscriber line, wherein reducing the amount of the particular crosstalk characteristic includes modifying, at a digital signal processor, a first signal corresponding to the first digital subscriber line based on a second signal corresponding to the second digital subscriber line, wherein the particular crosstalk characteristic of the first digital subscriber line is caused by the second signal.

2. The method of claim 1, further comprising rearranging a termination at an access node, wherein rearranging the termination includes physically disconnecting a particular digital subscriber line from a first port of the access node and connecting the particular digital subscriber line to a second port of the access node, wherein the particular digital subscriber line is the first digital subscriber line or the second digital subscriber line.

3. The method of claim 1, further comprising rearranging a termination at an access node, wherein rearranging the termination includes electronically switching a particular digital subscriber line from a first port of the access node to a second port of the access node.

4. The method of claim 3, wherein the particular digital subscriber line is electronically switched using a cross-connection switching system.

5. The method of claim 1, further comprising rearranging terminations of the first digital subscriber line and the second digital subscriber line at an access node, wherein rearranging the terminations comprises determining an amount of a particular correlation of the particular crosstalk characteristic of the first digital subscriber line and the second digital subscriber line, and wherein the terminations are rearranged for the pair based on the amount of the particular correlation.

6. The method of claim 5, further comprising:
identifying a second pair of digital subscriber lines from the plurality of digital subscriber lines after the terminations are rearranged, the second pair of digital subscriber lines including a third digital subscriber line and a fourth digital subscriber line, wherein a second particular crosstalk characteristic of the third digital subscriber line has a correlation to the fourth digital subscriber line; and
determining whether to rearrange the terminations based on the second particular crosstalk characteristic of the third digital subscriber line.

7. The method of claim 1, further comprising:
generating a crosstalk reduction signal based on the second signal, wherein the crosstalk reduction signal is out of phase with the second signal; and
modifying the first signal includes using the crosstalk reduction signal to reduce an amount of the particular crosstalk characteristic of the first digital subscriber line.

8. A system comprising:
a processor; and
a memory accessible to the processor, the memory including instructions executable by the processor to perform operations comprising:
identifying a crosstalk characteristic of each of a plurality of digital subscriber lines;

identifying a pair of digital subscriber lines from the plurality of digital subscriber lines, the pair of digital subscriber lines including a first digital subscriber line and a second digital subscriber line, wherein the crosstalk characteristic of the first digital subscriber line has a correlation to the second digital subscriber line;

assigning the first digital subscriber line, the second digital subscriber line, or both, of the pair of digital subscriber lines to a common vectoring group, wherein the common vectoring group has a threshold number of digital subscriber lines; and reducing an amount of a particular crosstalk characteristic of the first digital subscriber line, wherein reducing the amount of the particular crosstalk characteristic includes modifying a first signal corresponding to the first digital subscriber line, wherein the first signal is modified based on a second signal corresponding to the second digital subscriber line, and wherein the particular crosstalk characteristic of the first digital subscriber line is caused by the second signal.

9. The system of claim 8, further comprising an interface to access a cross-connect switch to switch a termination point of a digital subscriber line of the plurality of digital subscriber lines from a first modem to a second modem.

10. The system of claim 8, wherein the processor is a digital signal processor coupled to a digital subscriber line of the plurality of digital subscriber lines.

11. The system of claim 10, wherein the digital signal processor is operable to reduce crosstalk between digital subscriber lines assigned to the common vectoring group.

12. The system of claim 8, further comprising a line card, the line card comprising:
a first set of digital signal processors, each digital signal processor of the first set of digital signal processors coupled to a digital subscriber line of the plurality of digital subscriber lines; and
a backplane including a communication channel to exchange the particular crosstalk characteristic associated with the pair of digital subscriber lines in the first set of digital signal processors.

13. The system of claim 12, wherein the communication channel is coupled to a second access node via a cross-connect switch and wherein the second access node has a second set of digital signal processors.

14. The system of claim 13, wherein the communication channel is configured to exchange the particular crosstalk characteristic associated with the pair of digital subscriber lines in the first set of digital signal processors with the second set of digital signal processors.

15. The system of claim 8, further comprising a plurality of line cards, each line card of the plurality of line cards having a plurality of digital signal processors, wherein each digital signal processor of the plurality of digital signal processors is operable to reduce crosstalk of the pair of digital subscriber lines assigned to the common vectoring group.

16. The system of claim 8, further comprising a cross-connect switching system that enables the first digital subscriber line that terminates at a first modem to be switched to terminate at a second modem.

17. A computer-readable storage device including instructions that, when executed by a processor, cause the processor to perform operations comprising:
identifying a crosstalk characteristic of each of a plurality of digital subscriber lines;
identifying a first digital subscriber line of the plurality of digital subscriber lines, wherein the crosstalk characteristic of the first digital subscriber line is caused at least in part by a second signal corresponding to a second digital subscriber line of the plurality of digital subscriber lines;

assigning the first digital subscriber line to a vectoring group, wherein the vectoring group supports up to a threshold number of digital subscriber lines, wherein the threshold number is based on a limited amount of resources available for use in crosstalk reduction; and reducing an amount of a particular crosstalk characteristic of the first digital subscriber line, wherein reducing the amount of the particular crosstalk characteristic includes modifying a first signal corresponding to the first digital subscriber line based on the second signal corresponding to the second digital subscriber line.

18. The computer-readable storage device of claim 17, wherein the second signal is communicated by the second digital subscriber line, and wherein the crosstalk characteristic is a measure of an effect of the second signal on the first digital subscriber line.

19. The computer-readable storage device of claim 17, wherein the first digital subscriber line is assigned to the vectoring group based on a magnitude of the crosstalk characteristic.

20. The computer-readable storage device of claim 17, wherein the limited amount of resources corresponds to a threshold number of digital subscriber lines that can be rearranged by a cross-connection switching system.

* * * * *